Aug. 26, 1924.

D. P. FLEMING

DOUGHNUT MACHINE

Filed Sept. 28, 1922   5 Sheets-Sheet 4

1,506,232

Douglas P. Fleming.
By Dyrenforth, Lee, Chritton & Wiles

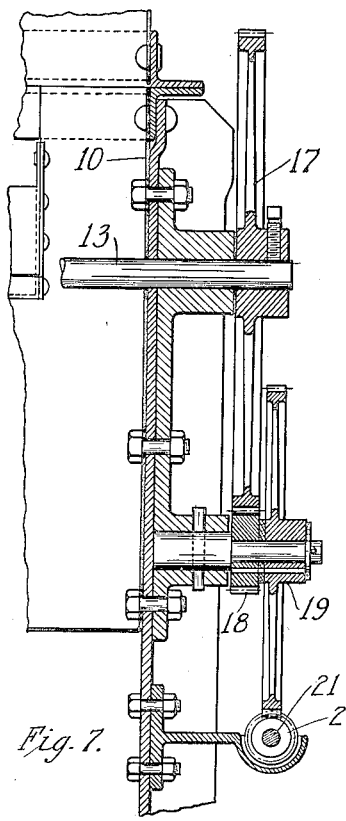
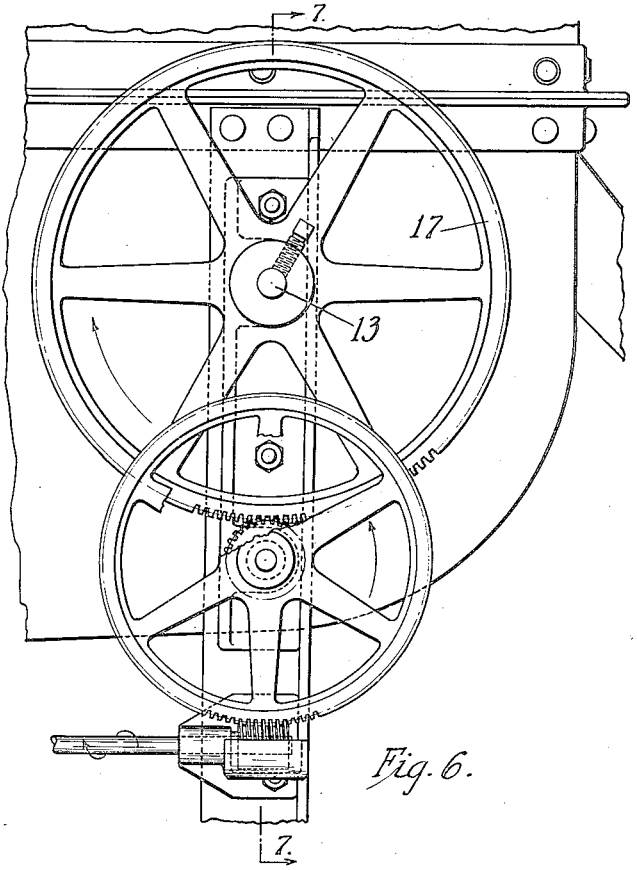
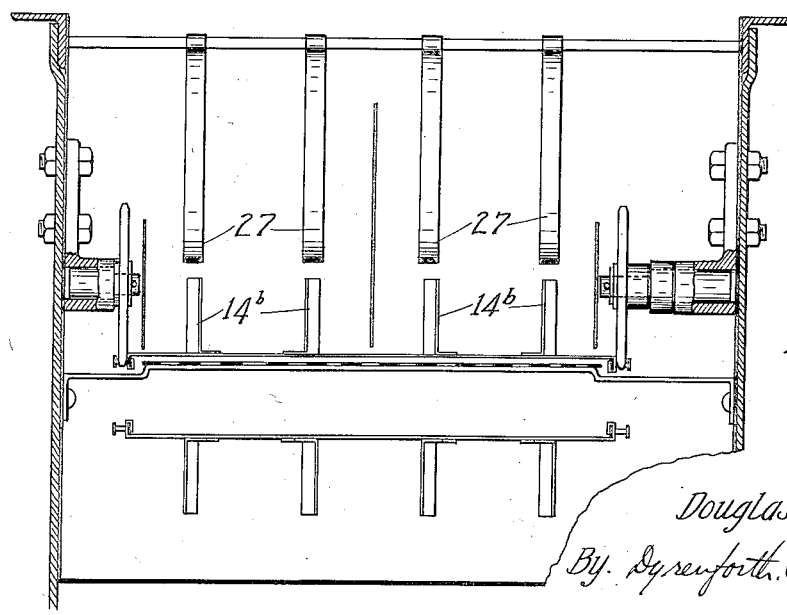

Patented Aug. 26, 1924.

1,506,232

UNITED STATES PATENT OFFICE.

DOUGLAS P. FLEMING, OF CHICAGO, ILLINOIS.

DOUGHNUT MACHINE.

Application filed September 28, 1922. Serial No. 591,156.

*To all whom it may concern:*

Be it known that I, DOUGLAS P. FLEMING, a citizen of the United States, residing at Chicago, in the county of Cook and State of Illinois, have invented a new and useful Improvement in Doughnut Machines, of which the following is a specification.

This invention relates to doughnut machines and the like, and is fully described in the following specification and shown in the accompanying drawings, in which:

Fig. 5 is an enlarged transverse vertical section on the line 5—5 of Fig. 2;

Fig. 6 is an enlarged detail of the gearing for driving the head-shaft of the conveyor; and Fig. 7 is a vertical section on the line 7—7 of Fig. 6.

Figure 1:
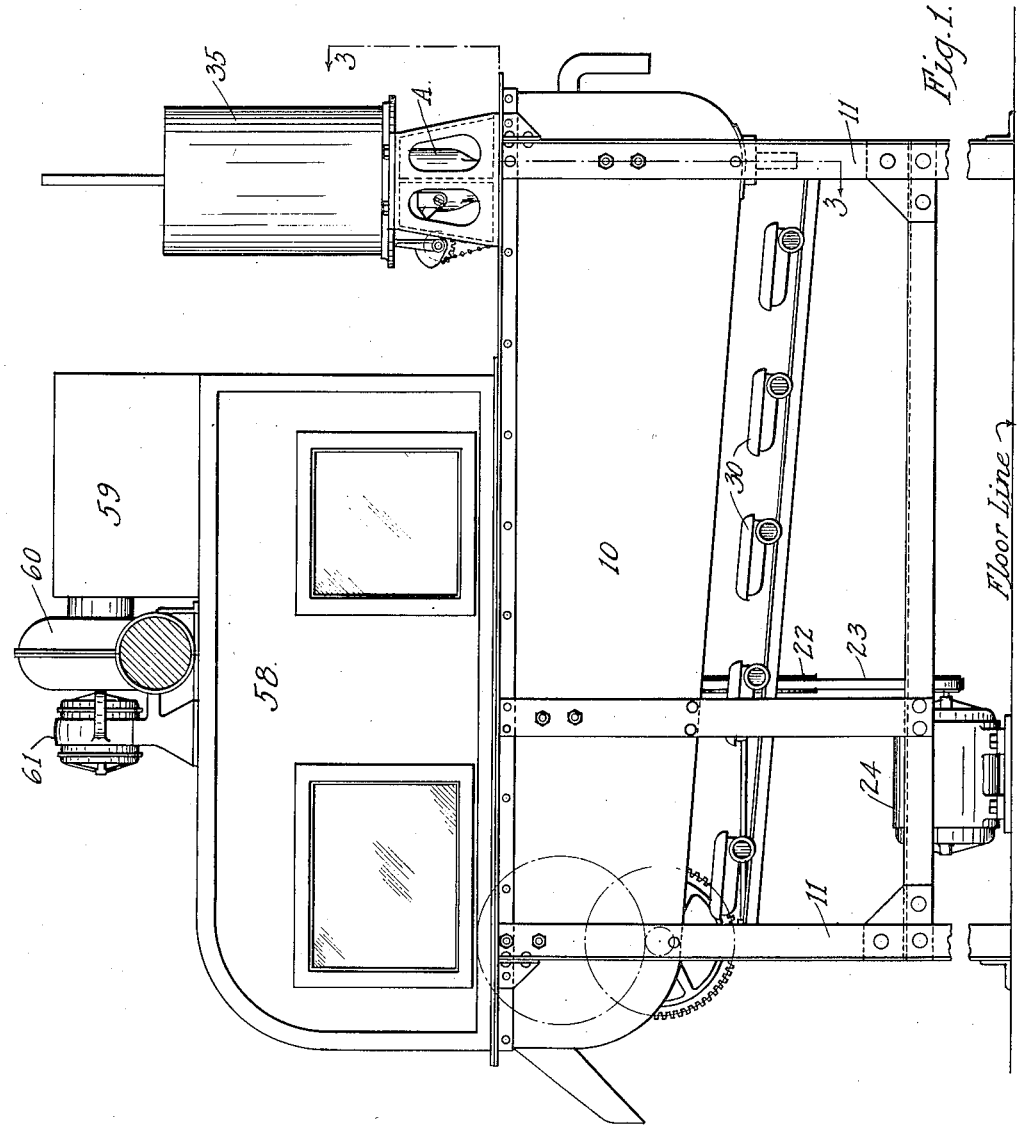
Figure 1 is a front elevation of a machine embodying the invention.

In the embodiment illustrated, the device comprises a tank 10 carried upon suitable legs 11. A small chain conveyor is located within the tank, having a head-sprocket 12 keyed upon the head-shaft 13, which is journalled in suitable bearings carried in the tank 10. Two parallel chains 14 pass over the head-sprockets and around the tail-sprockets 15 and thence forward and under the idler-sprockets 16. The tail and idler-sprockets are mounted upon shafts which are journalled in suitable bearings and preferably located entirely within the tank 10.

Referring now to Figs. 6 and 7, the head-shaft 13 passes through the side of the tank 10 and has a gear 17 keyed thereon which meshes with a pinion 18, which in turn is driven by the worm-wheel 19. This worm-wheel is driven by the worm 20 which is keyed to the shaft 21, the latter being driven by means of the pulley 22 and belt 23 from the motor 24.

Figure 2:
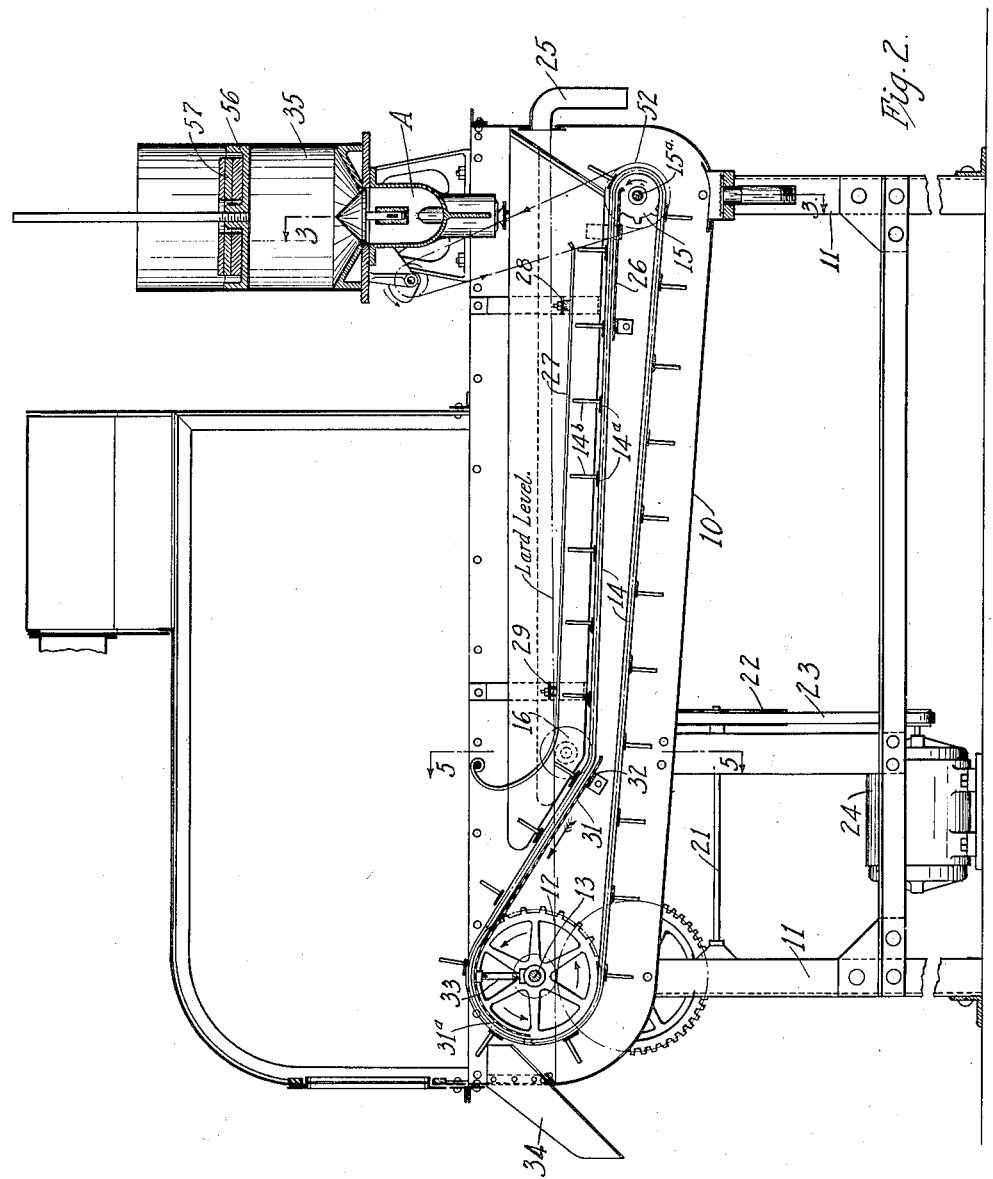
Fig. 2 is a longitudinal vertical section through the machine.

As shown in Fig. 2, an overflow pipe 25 is provided and the lard level is maintained at the height of this overflow pipe. It will thus be seen that the shafts which are below the lard level, namely, the shafts of the tail and idler-sprockets 15 and 16, do not pass through the sides of the tank, and the shaft 13 which does pass through the side of one tank is above the lard level.

Cleats 14ª serve to connect the chains 14 and these carry fingers 14ᵇ for feeding forward doughnuts as will later be explained. A perforated plate 26 is provided at the tail end of the conveyor upon which the raw doughnut falls from the doughnut cutting machine. Parallel strips 27 are placed longitudinally over the conveyor and supported by means of cross-members 28 and 29. The tank is filled with lard to the lard level as indicated in Fig. 2 which is heated to the proper temperature by any suitable means, such as burners 30.

It will be understood from the foregoing that when a raw doughnut drops from the doughnut cutting machine *a* it will fall upon the perforated plate 26 and that it will be properly timed so as to fall between a pair of succeeding fingers 14ᵇ.

The motor 24 being in operation, the chain is slowly being driven forward at such a speed as to properly cook the doughnut by the time it reaches the incline 31 which consists of a plurality of parallel strips carried at the lower end by the transverse member 32 and at the upper end by a transverse member which is supported by means of posts 33, the lower ends of which are journalled upon the shaft 13. Incline also acts as a drip for doughnuts after leaving the lard. As the cooked doughnut travels forward, it passes around the curved strips 31ª and is dropped down the chute 34. At the time the raw doughnut is dropped into the hot lard it sinks until it rests upon the perforated plate 26 which, however, need be only long enough to support the doughnut until it begins to cook, at which time the dough "raises" and the doughnut has a tendency to rise to the surface, but is held submerged by means of the longitudinal strips 27, so that it cooks uniformly on all sides.

Figure 3:
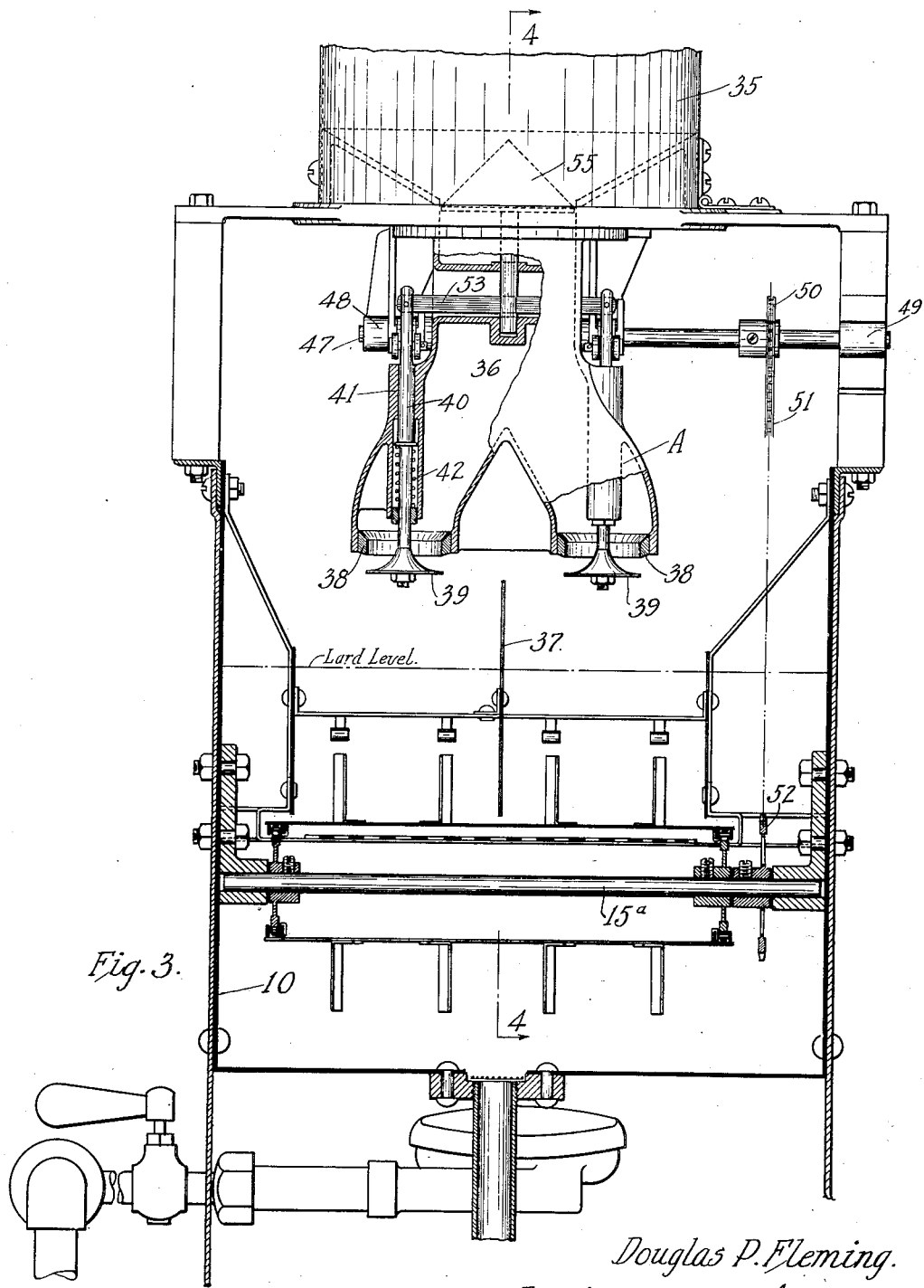
Fig. 3 is an enlarged transverse vertical section on the line 3—3 of Fig. 2.
Figure 4:
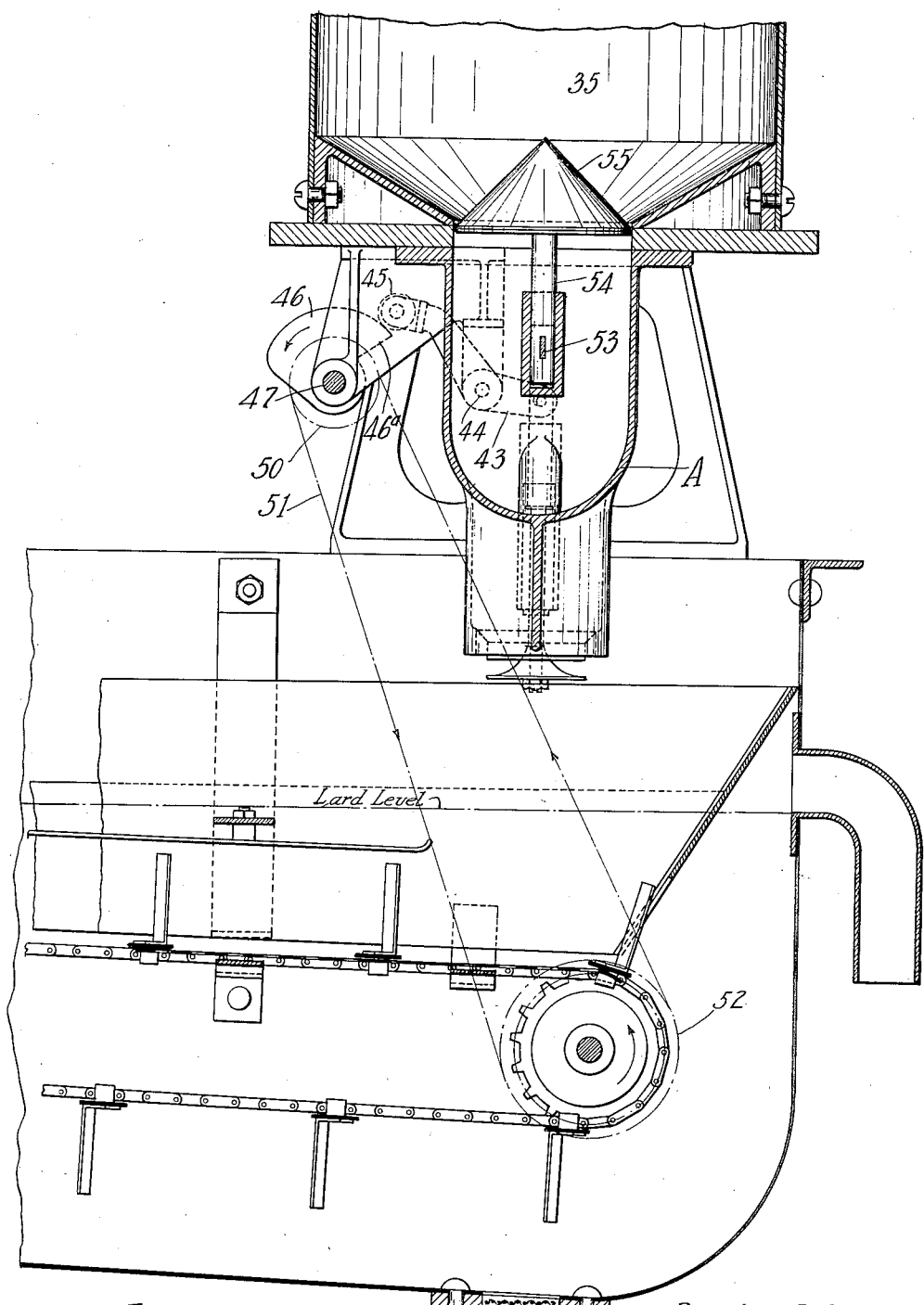
Fig. 4 is a partial enlarged longitudinal section on the line 4—4 of Fig. 3.

Referring now to Figs. 3 and 4, the doughnut cutting machine consists of a hopper 35 suitably supported above the tank 10 and having a passage 36 beneath which is preferably shown as bifurcated so as to supply doughnuts to both sides of the longitudinal partition 37 of the conveyor.

Each leg of the bifurcated passage 36 terminates in a die 38 having a circular opening which is closely fitted by a valve 39 having a stem 40 which is slidable in the bearing 41, which is formed in the side of the passage. A helical spring 42 serves to normally hold the valve 39 within the die 38 so as to prevent dough in the passage 36 from flowing therefrom. A bell-crank 43 is pivotally secured to the upper edge of each valve stem 40 and is pivotally mounted on the pin 44, the outer end of the bell-crank having a cam follower 45, which engages the face of a cam 46 which is keyed on the shaft 47. This shaft is journalled in bearings 48 and 49, and has a sprocket-wheel 50 keyed thereon which is driven by means of the chain 51 and sprocket-wheel 52 from the conveyor tail-shaft 15ª.

The two cams 46 are so set that the valves 39 open and close simultaneously. The cam faces 46ª, being a sheer drop so as to allow the valves to close suddenly under the action of the springs 42, thereby causing the raw doughnut to be suddenly severed and thereby insure a more perfectly formed doughnut and prevent it from clinging to the die.

The transverse bar 53 connects the upper ends of the valve stems 40 and passes through the stem 54 of the valve 55. As the valves 39 close the valve 55 is opened and permits dough from the hopper 35 to flow down into the passage 36. As the valves 39 open, however, the valve 55 is simultaneously lowered until it becomes closed at the full open position of the valves 39.

The piston 56 is preferably placed on top of the dough within the hopper 35 as shown in Fig. 2 and suitable weights 57 are placed on the piston. This arrangement insures a very uniform flow of the dough so that the doughnuts are uniform as to shape, size and weight, no matter whether the hopper 35 is nearly full or nearly empty.

A storage space 58 is provided above the tank 10, which may be utilized for storing doughnuts. This preferably communicates with the space above lard level in the tank 10 and fumes from the tank 10 and from this space are drawn out through the hood 59 by means of an exhauster 60 which delivers to a flue or the like and is driven by any suitable means, such as a motor 61.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is—

1. In a doughnut machine, a tank for holding lard, a conveyer in said tank, the tail end of which is submerged in the lard, means adjacent the tail end of the conveyer for supporting raw doughnuts until they raise sufficiently to float, means for dropping raw doughnuts on said last mentioned means and means above the conveyer for holding said doughnuts submerged in the lard for a predetermined distance of travel of the conveyer.

2. In a doughnut machine, a tank for holding lard, a conveyer in said tank, the tail end of which is submerged in the lard, a plate adjacent the tail end of the conveyer for supporting raw doughnuts until they raise sufficiently to float, means for dropping raw doughnuts on said plate, and means above the conveyer for holding said doughnuts submerged in the lard for a predetermined distance of travel of the conveyer.

3. In a doughnut machine, a tank for holding lard, a conveyer in said tank, the tail end of which is submerged in the lard, a plate adjacent the tail end of the conveyer for supporting raw doughnuts until they raise sufficiently to float, means for dropping raw doughnuts on said plate, and means above the conveyer for holding said doughnuts submerged in the lard for a predetermined distance of travel of the conveyer, said conveyer consisting of two parallel chains having bars passing over the top of said plate and fingers carried by the bars for advancing the doughnuts.

4. In a doughnut machine, a tank for holding lard, a conveyer in said tank, the tail end of which is submerged in the lard, a plate adjacent the tail end of the conveyer for supporting raw doughnuts until they raise sufficiently to float, means for dropping raw doughnuts on said plate and strips placed longitudinally over the conveyer for holding said doughnuts submerged in the lard for a predetermined distance of travel of the conveyer, said conveyer consisting of two parallel chains having bars passing over the top of said plate and fingers carried by the bars for advancing the doughnuts.

5. In a doughnut machine, a tank for holding lard, a conveyer in said tank, the tail end of which is submerged in the lard, a plate adjacent the tail end of the conveyer for supporting raw doughnuts until they raise sufficiently to float, means for dropping raw doughnuts on said plate, and strips placed longitudinally over the conveyer for holding said doughnuts submerged in the lard for a predetermined distance of travel of the conveyer, said conveyer consisting of two parallel chains having bars passing over the top of said plate and fingers carried by the bars for advancing the doughnuts, said means for dropping doughnuts being timed so as to drop a doughnut between each succeeding pair of fingers.

DOUGLAS P. FLEMING.